United States Patent Office 3,346,620
Patented Oct. 10, 1967

3,346,620
ACYLOXYALKYL ESTERS OF MONOIODINATED
BENZOIC ACIDS
James E. Siggins and James H. Ackerman, Bethlehem, N.Y., assignors to Sterling Drug Inc., New York, N.Y., a corporation of Delaware
No Drawing. Filed Oct. 12, 1964, Ser. No. 403,361
10 Claims. (Cl. 260—476)

This invention relates to esters of iodinated benzoic acids, and in particular is concerned with acyloxyalkyl esters of monoiodinated benzoic acids.

The preferred aspect of the invention relates to compounds of the formula

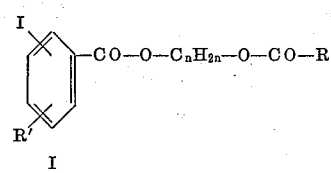

I wherein R is a member of the group consisting of lower-alkyl, lower-alkenyl, lower-alkoxy-lower-alkyl and lower-alkylthio-lower-alkyl; R' is a member of the group consisting of hydrogen and lower-alkoxy; and $n$ is an integer from 2 to 7.

In the above Formula I, the group R preferably contains from one to about eight carbon atoms and stands for lower-alkyl, including such groups interrupted by oxygen or sulfur, or by a double bond (lower-alkenyl). In the above Formula I, the group R', when lower-alkoxy, preferably contains from one to about four carbon atoms.

The compounds of the invention are prepared by any of three general methods as follows.

(A) Reaction of a substituted benzoyl halide with a hydroxyalkyl ester of an acid, HO—CO—R:

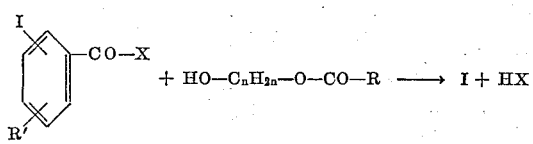

wherein X is halogen, preferably chlorine or bromine, and R, R' and $n$ have the meanings given hereinabove. The reaction takes place in the presence of a base such as aqueous alkali or an organic amine, tertiary amines, such as pyridine or triethylamine, being preferred.

(B) Reaction of a metal salt of a substituted benzoic acid with a haloalkyl ester of an acid, HO—CO—R:

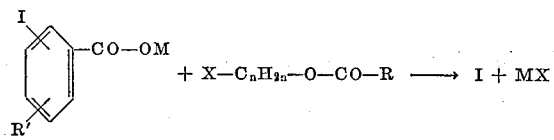

wherein M is a metallic cation, preferably an alkali metal, X is halogen, preferably chlorine or bromine, and R, R' and $n$ have the meanings given hereinabove. The reaction takes place either by heating together the reactants directly, or with an inert solvent or reaction medium, for example dimethylformamide.

The intermediates of formula X—$C_nH_{2n}$—O—CO—R are in turn prepared by reacting the appropriate halohydrin, X—$C_nH_{2n}$—OH with the appropriate acid chloride, Cl—CO—R.

(C) Reaction of a substituted benzoic acid with a haloalkyl ester of an acid, HO—CO—R, in the presence of a tertiary aliphatic amine, for example, triethylamine:

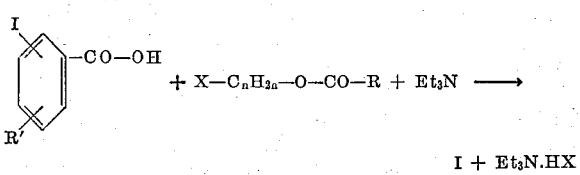

This method may be considered a variant of process B in which an amine salt of the substituted benzoic acid is employed in place of a metal salt.

The structures of the compounds of the invention were established by the modes of their preparation, their chemical and physical properties, and by the fact that elementary analyses found were in agreement with the values calculated for the expected structures.

The compounds of Formula I, including compounds derived from any of the members of the groups defining R and R', are useful as X-ray contrast media, and in particular find application as myelographic agents (i.e., for visualization of the spinal canal). For this purpose the compounds in liquid form are injected cisternally into a vertebrate organism. This procedure allows visualization of the spinal cord structures. The compounds of the invention possess the advantage of being eliminated from the animal organism in periods ranging from a few weeks to a few months, whereas myelographic agents presently in use, such as ethyl 10-(p-iodophenyl)undecylate, require much longer periods for elimination.

A few of the compounds of the invention are obtained in the form of low melting solids. These however, can be rendered liquid and applicable for myelography by admixture with a physiologically acceptable oil or with another member of the series which lowers the melting point below the ambient temperature.

The invention is illustrated by but not limited to the following examples.

EXAMPLE 1 (METHOD A)

2-acetoxyethyl 2-iodobenzoate

To 300 ml. of pyridine at 60° C. under anhydrous conditions was added 61 g. (0.23 mole) of 2-iodobenzoyl chloride, followed by 23.9 g. (0.23 mole) of 2-hydroxyethyl acetate in 100 ml. of pyridine in three portions over a period of five minutes. The reaction mixture was heated at 75° C. for four hours and at 85° C. for one hour, then cooled below 0° C. in an ice-salt bath and added dropwise to 880 ml. of ice-cold 6 N sulfuric acid. The resulting mixture was extracted with ether and the ether extracts were washed with water, 5% potassium carbonate solution and sodium chloride solution. The ether extracts were dried over anhydrous calcium sulfate, decolorized with activated carbon, and concentrated in vacuo. The residue was purified by distillation to give 25.0 g. of 2-acetoxyethyl 2-iodobenzoate, B.P. 129–133° C. (0.005 mm.), $n_D^{25}$=1.5651, viscosity (25° C.)=23.31 cs.

EXAMPLE 2 (METHOD B)

4-valeryloxybutyl 4-iodobenzoate

A solution of 27.0 g. (0.1 mole) of sodium p-iodobenzoate in 240 ml. of dimethylformamide was heated to 100° C., and 19.2 g. (0.1 mole) of 4-chlorobutyl valerate was added. The reaction mixture was heated at 110° C. for twenty-six hours and then poured into ice-water. The product was extracted with ether, and the ether extracts were washed with water, 5% potassium carbonate solution, water and sodium chloride solution, dried over anhydrous calcium sulfate and concentrated in vacuo. The residue was distilled to give 46.6 g. of 4-valeryloxybutyl 4-iodobenzoate, B.P. 157° C. (0.009 mm.), $n_D^{25}=1.5394$.

By replacing the sodium p-iodobenzoate in the preceding preparation by a molar equivalent amount of sodium 3-iodobenzoate or sodium 3-iodo-4-methoxybenzoate, there can be obtained, respectively, 4-valeryloxybutyl 3-iodobenzoate or 4-valeryloxybutyl 3-iodo-4-methoxybenzoate.

By replacing the 4-chlorobutyl valerate in the preceding preparation by a molar equivalent amount of 2-chloroethyl acrylate, 2-chloroethyl 3-ethoxypropionate, 3-chloroethyl 3-methylthiopropionate, 7-chloroheptyl acetate or 2-chloroethyl octanoate, there can be obtained, respectively, 2-acryloyloxyethyl 4-iodobenzoate, 2-(3-ethoxypropionyloxy)ethyl 4-iodobenzoate, 2-(3-methylthiopropionyloxy)ethyl 4-iodobenzoate, 7-acetoxyheptyl 4-iodobenzoate, or 2-octanoyloxyethyl 4-iodobenzoate.

EXAMPLE 3 (METHOD C)

*3-propionyloxypropyl 4-iodobenzoate*

To a solution of 39.6 g. (0.16 mole) of p-iodobenzoic acid in 220 ml. of dimethylformamide was added 23.6 ml. of (0.17 mole) of triethylamine. The solution was stirred for one hour and then 24.0 g. (0.16 mole) of 3-chloropropyl propionate was added dropwise. The reaction mixture was heated on a steam bath for twenty-four hours, then cooled and filtered to remove solid material. The filtrate was added to water and the product extracted with hexane. The hexane extracts were washed with water, 5% potassium carbonate, water, 3% hydrochloric acid, water and sodium chloride solution, dried over anhydrous calcium sulfate, decolorized with activated charcoal, and concentrated in vacuo. The residue was distilled to give 36.0 g. of 3-propionyloxypropyl 4-iodobenzoate, B.P. 131° C. (0.02 mm.), $n_D^{25}=1.5542$.

The following compounds were also prepared according to the above methods as indicated, employing the appropriate starting materials:

| Ex. | Name of Compound | Method |
|---|---|---|
| 4 | 3-(2-methylpropionyloxy)propyl 4-iodobenzoate | B |
| 5 | 3-hexanoyloxypropyl 4-iodobenzoate | B |
| 6 | 2-pentanoyloxyethyl 4-iodobenzoate | B |
| 7 | 4-acetoxybutyl 4-iodobenzoate | B |
| 8 | 3-(2-methoxyacetoxy)propyl 4-iodobenzoate | B |
| 9 | 2-propionyloxyethyl 4-iodobenzoate | B |
| 10 | 2-acetoxyethyl 4-iodobenzoate | C |
| 11 | 3-butyryloxypropyl 4-iodobenzoate | B |
| 12 | 3-acetoxypropyl 4-iodobenzoate | B |
| 13 | 3-valeryloxypropyl 4-iodobenzoate | B |
| 14 | 4-butyryloxybutyl 4-iodobenzoate | B |
| 15 | 2-hexanoyloxyethyl 4-iodobenzoate | B |
| 16 | 4-(3-methylbutyryloxy)butyl 4-iodobenzoate | B |
| 17 | 2-heptanoyloxyethyl 4-iodobenzoate | B |
| 18 | 4-propionyloxybutyl 4-iodobenzoate | B |
| 19 | 2-valeryloxypropyl 4-iodobenzoate | B |

PHYSICAL PROPERTIES

| Example | B.P., ° C. (mm. Hg.) | M.P., °C. | $n_D^{25}$ |
|---|---|---|---|
| 4 | 154 (0.05) | | 1.5450 |
| 5 | 154 (0.05) | | 1.5380 |
| 6 | 120 (0.009) | | 1.5470 |
| 7 | 123 (0.02) | | 1.5548 |
| 8 | 157–161 (0.02) | 30.0–31.8 | 1.5558 |
| 9 | 113 (0.02) | | 1.5574 |
| 10 | 106–108 (0.01) | 36.4–37.2 | 1.5693 |
| 11 | 126 (0.007) | | 1.5479 |
| 12 | 118–120 (0.05) | 44.0–45.0 | |
| 13 | 129 (0.008) | | 1.5420 |
| 14 | 151 (0.04) | | 1.5427 |
| 15 | 154 (0.05) | | 1.5414 |
| 16 | 142 (0.02) | | 1.5362 |
| 17 | 143 (0.04) | | 1.5368 |
| 18 | 138 (0.04) | | 1.5480 |
| 19 | 135 (0.009) | | 1.5323 |

The following intermediates were used in the foregoing preparations:

2-hydroxyethyl acetate, B.P. 84–86° (13 mm.), $n_D^{25}=1.4163$.

4-chlorobutyl valerate, B.P. 134–135° (26 mm.), $n_D^{25}=1.4373$, prepared from valeryl chloride and 4-chlorobutanol.

3-chloropropyl propionate, B.P. 79–83° (12 mm.), $n_D^{25}=1.4293$, prepared from propionyl chloride and 3-chloropropanol.

3-chloropropyl isobutyrate, B.P. 98–99° (28 mm.), $n_D^{25}=1.4275$, prepared from isobutyryl chloride and 3-chloropropanol.

3-chloropropyl hexanoate, B.P. 133–134° (23 mm.), $n_D^{25}=1.4362$, prepared from caproyl chloride and 3-chloropropanol.

2-chloroethyl pentanoate, B.P. 91° (17 mm.), $n_D^{25}=1.4298$, prepared from valeryl chloride and 2-chloroethanol.

4-chlorobutyl acetate, B.P. 87° (12 mm.), $n_D^{25}=1.4325$, prepared from acetyl chloride and 4-chlorobutanol.

3-chloropropyl methoxyacetate, B.P. 107–110° (8 mm.), $n_D^{25}=1.4392$, prepared from methoxyacetic acid and 3-chloropropanol.

2-chloroethyl propionate, prepared from propionyl chloride and 2-chloroethanol.

2-chloroethyl acetate, B.P. 46° (8 mm.), $n_D^{25}=1.4210$, prepared from acetyl chloride and 2-chloroethanol.

3-chloropropyl butyrate, prepared from butyryl chloride and 3-chloropropanol.

3-chloropropyl acetate, B.P. 64–65° (10 mm.), prepared from acetyl chloride and 3-chloropropanol.

3-chloropropyl valerate, B.P. 109–112° (16 mm.), $n_D^{25}=1.4339$, prepared from valeryl chloride and 3-chloropropanol.

4-chlorobutyl butyrate, B.P. 114–116° (16 mm.), $n_D^{25}=1.4352$, prepared from butyl chloride and 4-chlorobutanol.

2-chloroethyl hexanoate, B.P. 110–111° (18 mm.), $n_D^{25}=1.4321$, prepared from caproyl chloride and 2-chloroethanol.

4-chlorobutyl 3-methylbutyrate, B.P. 132–133° (27 mm.), $n_D^{25}=1.4348$, prepared from 3-methylbutyryl chloride and 4-chlorobutanol.

2-chloroethyl heptanoate, B.P. 131–134° (32 mm.), $n_D^{25}=1.4356$, prepared from heptanoyl chloride and 2-chloroethanol.

4-chlorobutyl propionate, B.P. 105–108° (20 mm.), $n_D^{25}=1.4344$, prepared from propionyl chloride and 4-chlorobutanol.

2-chloropropyl valerate, B.P. 108–109° (30 mm.), $n_D^{25}=1.4272$, prepared from valeryl chloride and 2-chloropropanol.

We claim:
1. A compound of the formula

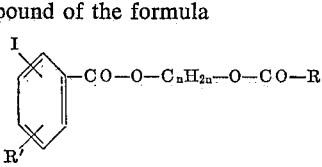

wherein R is a member of the group consisting of lower-alkyl, lower-alkenyl, lower-alkoxy-lower-alkyl and lower-alkylthio-lower-alkyl; R' is a member of the group consisting of hydrogen and lower-alkoxy; and $n$ is an integer from 2 to 7.

2. A compound of the formula

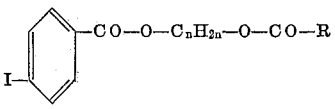

wherein R is lower-alkyl and $n$ is an integer from 2 to 7.

3. 4-valeryloxybutyl 4-iodobenzoate.

4. 2-pentanoyloxyethyl 4-iodobenzoate.
5. 3-propionyloxypropyl 4-iodobenzoate.
6. 3-valeryloxypropyl 4-iodobenzoate.
7. 4-(3-methylbutyryloxy)butyl 4-iodobenzoate.
8. 2-heptanoyloxyethyl 4-iodobenzoate.
9. 4-propionyloxybutyl 4-iodobenzoate.
10. 2-valeryloxypropyl 4-iodobenzoate.

References Cited
FOREIGN PATENTS
661,185  11/1951  France.

RICHARD K. JACKSON, *Primary Examiner.*
T. L. GALLOWAY, *Assistant Examiner.*